United States Patent
Vandendoren et al.

(10) Patent No.: US 10,150,677 B2
(45) Date of Patent: *Dec. 11, 2018

(54) METHOD FOR INCREASING EVAPORATION RATE OF AN EVAPORATIVE POND

(71) Applicant: SOLVAY SA, Brussels (BE)

(72) Inventors: Alain Vandendoren, Brussels (BE); Jessica A. Mote, Kaycee, WY (US)

(73) Assignee: Solvay SA, Brussels (BE)

( * ) Notice: Subject to any disclaimer, the term of this patent is extended or adjusted under 35 U.S.C. 154(b) by 923 days.

This patent is subject to a terminal disclaimer.

(21) Appl. No.: 14/132,149

(22) Filed: Dec. 18, 2013

(65) Prior Publication Data
US 2014/0174673 A1    Jun. 26, 2014

Related U.S. Application Data

(60) Provisional application No. 61/740,195, filed on Dec. 20, 2012.

(51) Int. Cl.
*C01D 5/18* (2006.01)
*C01D 7/22* (2006.01)
(Continued)

(52) U.S. Cl.
CPC .......... *C01D 7/22* (2013.01); *B01D 1/18* (2013.01); *B65G 5/00* (2013.01); *C02F 1/12* (2013.01);
(Continued)

(58) Field of Classification Search
CPC .......... B01D 1/0058; B01D 1/18; B01D 1/16; B01D 1/20; C01D 7/24; C01D 5/18; C01D 7/22; C01D 7/26
(Continued)

(56) References Cited

U.S. PATENT DOCUMENTS 1,853,275 A * 4/1932 Houghton ............... C01D 7/00
23/297
3,498,744 A * 3/1970 Frint ................... C01D 7/126
23/302 R
(Continued)

FOREIGN PATENT DOCUMENTS

DE    102010 024725 A1    12/2011
WO    WO 2009/068670 A1    6/2009
WO    WO 2011/151484 A1    12/2011

OTHER PUBLICATIONS

U.S. Appl. No. 14/132,183, filed Dec. 18, 2013, Vandendoren et al.

*Primary Examiner* — Jonathan Miller
*Assistant Examiner* — Jonathan Luke Pilcher
(74) *Attorney, Agent, or Firm* — Beatrice C. Ortego

(57) ABSTRACT

A method for increasing the evaporation rate of an evaporative pond containing pond liquor comprising water and at least 1% by weight of sodium carbonate, said evaporative pond being in contact with an ambient air at an ambient air temperature of more than 0° C., the method comprising the following steps: feeding part of the pond liquor to a heat exchanger; heating the pond liquor in the heat exchanger with heat and producing a heated pond liquor; feeding the heated pond liquor into a spraying device at an operating temperature of at least 10° C. above the ambient air temperature; and spraying the heated pond liquor into an open area of the evaporative pond with the spraying device, so as to evaporate at least part of the water of the pond liquor when sprayed.

21 Claims, 1 Drawing Sheet

(51) Int. Cl.
*C01D 7/24* (2006.01)
*B01D 1/16* (2006.01)
*B01D 1/18* (2006.01)
*B01D 1/20* (2006.01)
*C02F 1/12* (2006.01)
*B65G 5/00* (2006.01)
*E21B 43/28* (2006.01)
*C02F 103/10* (2006.01)

(52) U.S. Cl.
CPC ............... *E21B 43/28* (2013.01); *B01D 1/16* (2013.01); *B01D 1/20* (2013.01); *C01D 5/18* (2013.01); *C01D 7/24* (2013.01); *C02F 2103/10* (2013.01)

(58) Field of Classification Search
USPC ... 159/32, 36, 33, 34, 35, 37, 38, 39, 40, 41
See application file for complete search history.

(56) References Cited

U.S. PATENT DOCUMENTS

| | | | |
|---|---|---|---|
| 4,039,617 A | 8/1977 | Kuo | |
| 4,116,757 A | 9/1978 | Garofano et al. | |
| 4,704,189 A * | 11/1987 | Assaf | B01D 1/14 159/48.2 |
| 5,509,996 A * | 4/1996 | Assaf | B01D 1/14 159/4.01 |
| 5,601,688 A * | 2/1997 | Assaf | B01D 1/16 159/4.01 |
| 5,624,647 A | 4/1997 | Zolotoochin et al. | |
| 6,027,607 A | 2/2000 | Corniel | |
| 7,604,710 B2 * | 10/2009 | Haslem | B01D 1/16 159/3 |
| 7,645,435 B2 * | 1/2010 | Braman | C01D 7/00 423/206.2 |
| 8,337,571 B2 * | 12/2012 | Phillip | C01D 5/14 23/295 R |
| 8,771,622 B2 * | 7/2014 | Hughes | C01D 5/16 423/173 |
| 9,115,003 B2 * | 8/2015 | Vandendoren | B01D 1/0035 |
| 2003/0143149 A1 | 7/2003 | Braman et al. | |
| 2004/0197258 A1 * | 10/2004 | Braman | C01D 7/00 423/427 |
| 2010/0226840 A1 * | 9/2010 | Phillip | C01D 5/14 423/184 |
| 2011/0274599 A1 * | 11/2011 | Hughes | C01D 5/16 423/184 |

* cited by examiner

Variant of Fig. 1

METHOD FOR INCREASING EVAPORATION RATE OF AN EVAPORATIVE POND

CROSS-REFERENCE TO RELATED APPLICATIONS

This application claims priority to U.S. provisional application No. 61/740,195 filed on Dec. 20, 2012, the whole content of this application being incorporated herein by reference for all purposes.

TECHNICAL FIELD

The invention relates to a method for increasing the evaporation rate of an evaporative pond containing a pond liquor comprising water and sodium carbonate, using heat and a spraying device, to enhance the evaporation rate with wind and unsaturated air of the pond liquor, therefore increase the time period of the year in which effective evaporation takes place, and reducing the surface needed to treat a given flow of a sodium carbonate aqueous stream that may feed the evaporative pond. The invention also relates on a method for increasing the evaporation rate of an evaporative pond containing a pond liquor comprising water and sodium carbonate using low temperature heat and/or spare heat and a spraying device.

BACKGROUND

Evaporative ponds dimensioning relies mainly among parameters to local water precipitations from rain, ambient air temperature during the year, and the wind velocity conditions forcing heat convection.

One way to accelerate the evaporation is to increase the temperature of the liquor relatively to the ambient air temperature and its associated dew point. Another way to accelerate the evaporation is to increase the contact surface between air and the liquor comprising water to be partially evaporated. Among those ways, spraying systems enable to divide a liquor into droplets having more evaporation specific surface area than the more or less flat surface of the corresponding liquor stored in a pond. Though operating spraying devices with aqueous solutions comprising water and sodium carbonate and optionally other soluble salts such as sodium bicarbonate, sodium chloride, or sodium sulfate leads to fast scaling and clogging of those spraying devices at the outlet of the spraying devices when water is evaporated.

Among the industries using evaporative ponds, soda ash production from natural ores or from alkaline lakes is one of them. The main natural ores comprising sodium carbonate are: trona, nahcolite or wegscheiderite ores. Those natural ores can be found in different geographical areas such as Brazil, China, Kazakhstan, Mexico, Turkey, USA (Wyoming, Colorado, California). Alkaline lakes are found mainly in Africa. Those natural ores can be mechanically mined, for instance using longwall equipments, or be mined by solution mining with water.

The production of soda ash and its derivatives from natural ore or from alkaline lakes, results in the production of purge streams containing sodium carbonate. Indeed most of the natural deposits contain impurities such as insoluble particles (sand, clay, calcium carbonate, feldspar, . . . ) and soluble salts mainly evaporite salts (sodium chloride, sodium sulfate, . . . ).

The impurities must be removed from the process lines to guarantee a final product quality required for main uses of soda ash: such as glass production, or food and pharmaceutical production of refined sodium bicarbonate. Most of the soluble impurities such as soluble salts or less soluble compounds are removed from the production process as aqueous solutions or aqueous suspension comprising aqueous solution in different purge streams containing sodium carbonate.

Generally the soluble impurities are removed by a purge control during the crystallization steps in order to guarantee the final soda ash or soda ash derivative quality.

Moreover when using a solution mining an higher amount of water is used per ton of soda ash or soda ash derivatives compared to a conventional dry mining operation, increasing therefore the needs to control the water balance and the evaporation energy optimization when combining evaporative ponds and industrial evaporators fed with steam from a steam generator.

U.S. Pat. No. 1,853,275 (1932) discloses a manufacturing process of sodium carbonate from salt residues of alkaline waters in Owens Lake (California). The document teaches to avoid the building and operating of evaporation ponds to store summer brine of the lake. It teaches to use steam to melt crystals of sodium carbonate decahydrate and sodium chloride in a sodium sulfate rich brine and reach the three solid phases sodium carbonate monohydrate, $Na_2CO_3.2Na_2SO_4$ double salt, and sodium chloride to precipitate double salt to decrease sodium sulfate concentration of the brine. The double salt is removed from the resulting brine and purified sodium carbonate decahydrate is then crystallized. The document is silent on the use of indirect heating by using a heat exchanger to enhance the evaporation of the evaporation pond, silent on the use of spraying device and on spraying conditions.

US2003/0143149 discloses a process for recovering the sodium carbonate from evaporative pond water using heat to heat a sodium carbonate recovery stream before introducing it to an evaporation pond (20). The pond liquor is heated at 120-140° F. (49-60° C.) before being causticized with caustic or quicklime. The described process is silent on the use of spraying device and spraying conditions. It is also silent on multi-ponds operation.

The present invention aims to propose an improved method for increasing the evaporation rate of an evaporative pond containing a sodium carbonate solution using spraying device and low temperature heat or waste heat, in particular from a steam generator or from a soda ash plant.

SUMMARY OF THE INVENTION

The invention relates to a method for increasing the evaporation rate of an evaporative pond containing pond liquor comprising water and at least 1% by weight of sodium carbonate, said evaporative pond being in contact with an ambient air at an ambient air temperature of more than 0° C., the method comprising the following steps:
 feeding part of the pond liquor to a heat exchanger,
 heating the pond liquor in the heat exchanger with heat and producing a heated pond liquor,
 feeding the heated pond liquor into a spraying device at a temperature called hereafter 'operating temperature' of at least 10° C., preferably at least 15° C., more preferably at least 20° C. above the ambient air temperature, spraying the heated pond liquor into an open area of the evaporative pond with the spraying device, so as to evaporate at least part of the water of the pond liquor when sprayed.

A first advantage of the present invention is to improve the operation conditions of enhance evaporation devices using spraying systems for pond liquors containing sodium carbonate.

A second advantage of the present invention is the increased evaporation rate of an evaporative pond containing a sodium carbonate pond liquor increasing the annual evaporation rate per surface unit of pond.

A third advantage of the present invention is the increased period of time during the year during which evaporation takes place, in particular in the off-season for instance in northern hemisphere (in southern hemisphere seasons should be inversed): early spring (March-April) and late fall (October-November). This almost double the time period of efficient evaporation compared to the main evaporation period (May to September in northern hemisphere, November to March in southern hemisphere) when only natural evaporation is used without using enhanced evaporation systems and heat.

A fourth advantage of the present invention is to increase the convection locally in the evaporative pond areas where the pond liquor is removed to be fed into the spraying device and where the pond liquor is sprayed back; this generates a more uniform concentrations of the pond liquor in the evaporative pond and this improves also the convection and evaporation at the ambient air/pond liquor interfaces, in particular during off-season where sodium decahydrate crystals are generated on surface of the ponds during colder nights or days.

A fifth advantage of the present invention is the possibility of combined synergy between evaporative ponds of liquors containing sodium carbonate and low temperature heat or waste heat from a steam generator and in particular from a soda ash plant using a steam generator, decreasing therefore the carbon foot print of such processes.

A sixth advantage of the present invention is the possibility of combined synergy between such enhanced evaporation devices with increased concentration of sodium chloride or sodium sulfate in the generated sodium carbonate liquor in the evaporative pond, that enables to reduce the clogging speed of enhanced evaporative devices. This is also particularly advantageous when enhanced evaporation devices are combined with multi-ponds management techniques such as techniques using at least one decahydrate sodium carbonate crystallizing pond associated with an evaporative pond and/or an evaporative-double salt crystallizing pond.

DEFINITIONS

Figure 1:
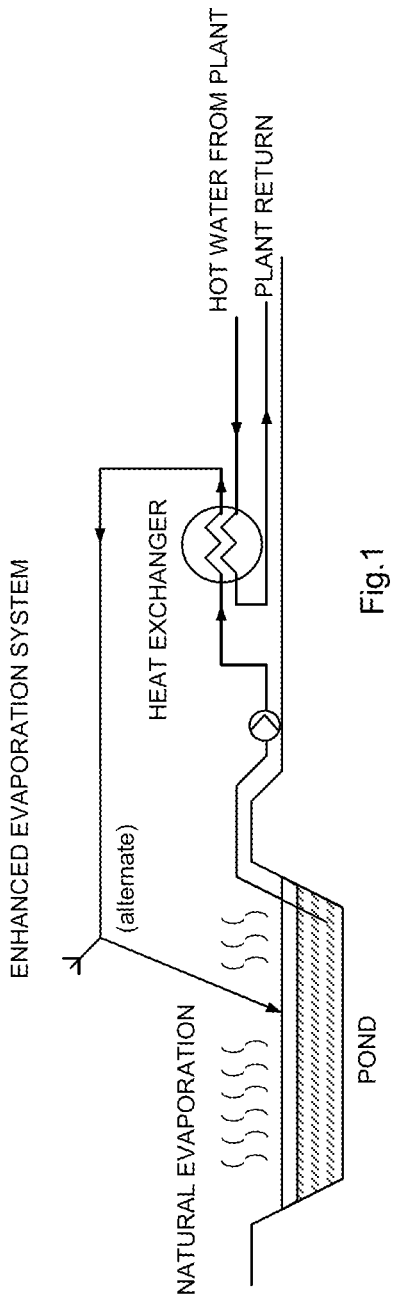
FIG. 1 is a schematic illustration of an embodiment of the method in accordance with the principles of the present invention.
Figure 2:
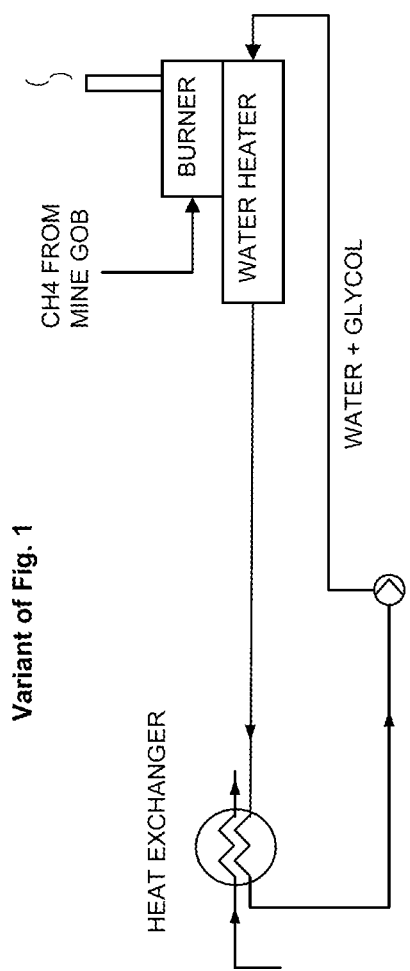
FIG. 2 is a schematic illustration of an embodiment of the method in accordance with the principles of the present invention.

The term 'solubility' refers to the water solubility of a compound in an aqueous solution.

The term 'soda ash' refers to sodium carbonate, generally contemplated in its anhydrous solid form ($Na_2CO_3$).

The term 'soda ash derivatives' refers to chemical compounds synthesized from soda ash used as starting material, including: sodium bicarbonate, sodium sesquicarbonate ($Na_2CO_3.2NaHCO_3.2H_2O$), wegscheiderite or decemite ($Na_2CO_3.3NaHCO_3$), caustic soda (NaOH) from causticization with lime, sodium sulfite, sodium bisulfate, sodium metabisulfite, sodium sulfate, sodium phosphate.

The term 'double salt' refers to sodium carbonate-sodium sulfate double salt ($Na_2CO_3.2Na_2SO_4$ also called burkeite) unless specified otherwise. The term 'comprising' includes "consisting essentially of" and also "consisting of".

In the present description, where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components. Further, it should be understood that elements and/or features of an apparatus, a process, or a method described herein can be combined in a variety of ways without departing from the scope and disclosures of the present teachings, whether explicit or implicit herein.

When the term "about" is used before a quantitative value, the present teachings also include the specific quantitative value itself, unless specifically stated otherwise. As used herein, the term "about" refers to a +−10% variation from the nominal value unless specifically stated otherwise.

DETAILED DESCRIPTION OF THE INVENTION

The invention relates to a method for increasing the evaporation rate of an evaporative pond containing pond liquor comprising water and at least 1% by weight of sodium carbonate, said evaporative pond being in contact with an ambient air at an ambient air temperature of more than 0° C., the method comprising the following steps:
feeding part of the pond liquor to a heat exchanger,
heating the pond liquor in the heat exchanger with heat and producing a heated pond liquor,
feeding the heated pond liquor into a spraying device at a temperature called hereafter 'operating temperature' of at least 10° C., preferably at least 15° C., more preferably at least 20° C. above the ambient air temperature,
spraying the heated pond liquor into an open area of the evaporative pond with the spraying device, so as to evaporate at least part of the water of the pond liquor when sprayed.

In the present invention the sodium carbonate pond liquor is an aqueous liquor comprising sodium carbonate. The pond liquor generally comprises more than 1% by weight of sodium carbonate. It generally comprises less than 36% by weight of sodium carbonate. In one embodiment of the invention the pond liquor comprises at most 30%, advantageously at most 25%, more advantageously at most 18%, even more advantageously at most 10% by weight of sodium carbonate. The remaining of the pond liquor is mainly water. Sodium carbonate may be partially bicarbonated with atmospheric $CO_2$. Though, in the present invention, it is preferable that the pond liquor comprises at most 4%, advantageously at most 3%, more advantageously at most 2%, even more advantageously at most 1% by weight of sodium bicarbonate. This improves the duration of operation of the spraying device, before regeneration or washing. In a particular embodiment, the pond liquor comprises at most 18% sodium carbonate and at most 3% sodium bicarbonate, or at most 10% sodium carbonate and at most 4% sodium bicarbonate.

The pond liquor may also contain other soluble salts than sodium carbonate, such as sodium chloride and/or sodium sulfate. In such case the pond liquor comprises generally from 1 to 25% in weight of other soluble salts, in particular from 1 to 25% in weight of sodium chloride and/or sodium sulfate. When the pond liquor comprises sodium chloride and sodium sulfate it is preferred that the pond liquor comprises at most 25% in weight of cumulative concentrations of both said soluble salts. It is more preferred that the pond liquor comprises at most 25% in weight of cumulative concentrations of both said soluble salts, and of sodium carbonate and of sodium bicarbonate.

In the present invention, the pond liquor is preferably not saturated in sodium chloride and/or sodium sulfate and/or sodium sesquicarbonate at the ambient air temperature. When the ambient temperature drops down during the night, or a cold day, the pond liquor if saturated in a sodium salt is saturated mainly in sodium carbonate decahydrate. In particular it is not saturated in sodium chloride or in double salt or in sodium sesquicarbonate. It has been observed that a pond liquor in such concentration domain enables to decrease the clogging speed of enhance evaporation devices, and enables a faster recovering of spraying capabilities and pressure drop with sequential over-heating or with sequential water feeding operations described hereafter in the present document.

The pond liquor is advantageously a decanted liquor having less than 1%, more advantageously less than 0.1% by weight of solid content such as solid particles of sand, clay, or fine soluble salt crystals. Particle size of solid particles should advantageously be the third, more advantageously the tenth of the smaller space cord distance inside the spraying device. This enables to improve spraying duration of the spraying device and limits efficiently the clogging of the spraying device within its internal parts.

The heat exchanger may be any type of heat exchanger known in the art of the chemical industry. In present invention a spiral heat exchanger or a plate and frame exchanger or a tube and frame exchanger are particularly suited. The heat exchanger is advantageously chosen among dismountable heat exchangers such as spiral heat exchanger or plate and frame heat exchanger. This enables to clean the heat exchanger surfaces from building up solid particles crusts or soluble salts crystals such as: sodium carbonate monohydrate crystals, sodium carbonate heptahydrate crystals, sodium carbonate decahydrate crystals, sodium sulfate decahydrate crystals, sodium bicarbonate, sodium sesquicarbonate, and burkeite ($Na_2CO_3 \cdot 2Na_2SO_4$).

In present invention the 'operating temperature' corresponds to the temperature of the heated pond liquor fed into the spraying device, therefore to the temperature of the liquor before being sprayed and does not correspond to the temperature of the liquor after being sprayed. Indeed, in the spraying device when the liquor is sprayed, a pressure drop and some endothermic water evaporation occurs. This induces a drop of a few or of several degrees centigrade of the liquor after spraying depending mainly from the pressure drop (adiabatic expansion of the liquid) and on the optional presence of pressurized unsaturated air co-fed with the liquor in pressurized air-liquid spraying device.

In present invention it has been observed that a too low ambient air temperature leads to a fast crystallization of sodium carbonate/bicarbonate/sulfate crystals or their hydrate crystals on the outlet of the spraying device, leading to a fast clogging of the spraying device. In present invention, the ambient air temperature is advantageously at least 5° C., preferably at least 10° C., more preferably at least 15° C.

In order to reduce the feeding energy such as the energy consumed by pumps, the pumped flow should be minimized. The evaporation of the water of a sodium carbonate liquor is an endothermic phenomenon. The temperature difference between operating temperature of the heated pond liquor fed to the spraying device and the ambient air temperature should be then maximized to minimize the feeding flow to the spraying device and therefore to minimize the feeding energy. In present invention, the operating temperature is generally at least 15° C., advantageously at least 20° C., more advantageously at least 30° C., preferably at least 35° C.

Though it has been observed that also when the operating temperature is too high, carbonate liquors induce also a fast and hard clogging at the outlet of the spraying device. In present invention, the operating temperature is generally at most 95° C., advantageously at most 75° C., more advantageously at most 60° C., preferably at most 48° C.

In a particular embodiment of the present invention the operating temperature is advantageously at least 15° C. and at most 95° C., more advantageously at least 20° C. and at most 75° C., preferably at least 30° C. and at most 60° C., more preferably at least 35° C. and at most 48° C.

The inventors have observed, particularly when the ambient air temperature is lower than 35° C., as during off seasons (spring and fall), that a sequential over-heating during a short time, such as 5 to 10 minutes every two hours or preferably every hour, of the heated pond liquor enable to increase substantially the operating duration of the spraying device before clogging. Therefore in one embodiment of the invention the heated pond liquor is sequentially heated at a sequential temperature before being sprayed by the spraying device, and the sequential temperature is at least 5° C., advantageously at least 10° C., preferably at least 15° C. above the operating temperature.

In present method the spraying device may be chosen from any type of spraying device fractioning the fed heated pond liquor into droplets. The spraying energy consumed by a spraying device is generally proportional to the surface area of the generated droplets. Therefore the spraying energy reported by volume unit of heated pond liquor is inversely proportional to the droplets size. Though, too big droplets size reduces the evaporation rate reported by liquor volume. In present method, sizes of the droplets are generally between 1 μm and 50 mm, advantageously between 10 μm to 10 mm, more advantageously between 0.1 mm to 7 mm, even more advantageous between 0.5 mm and 5 mm.

In present method, particularly suited spraying devices are chosen among the group consisting of: irrigation sprinkler device, rotating sprinkler device, hose reel raingun sprinklers system, centre pivot sprinklers system, spray nozzles, spray nozzles arrays, turbomist device and combinations thereof. Turbomist device is more particularly suited.

Advantageously, the spraying device comprises parts in contact with the pond liquor in plastic material such as: PVC, Polyethylene, Polypropylene, PVDF, PTFE, or in metal selected from the group consisting of: steel, stainless steel AISI 304, AISI 316, AISI 904, Nickel, and Nickel alloys.

In the present method, the heat may be provided by any type of heating fluid such as hot gases, hot liquids, or hot solids (for instance hot soils heated by geothermic springs).

In the present description, the adjective 'hot' for gases, liquids, or solids is understood to qualify a fluid which temperature is above the operating temperature of the heated pond liquor. Generally, the temperature of the heating fluid is at least 5°, advantageously at least 10°, more advantageously at least 20°, even more advantageously at least 50° C. above the operating temperature of the heated pond liquor. In one embodiment of the method, the temperature of the heating fluid is at most 140°, advantageously at most 80°, more advantageously at most 50° C. above the operating temperature of the heated pond liquor.

In soda ash or soda ash derivatives production units, hot fluids at low temperature are often available and their heat at low temperature is not further used or valorized. Therefore the corresponding heat is qualified as 'waste heat'.

In one embodiment of the present method, the heat is selected among the group consisting of hot steam condensate, low pressure steam of less than 3.5 bars, and combination thereof. Advantageously in this embodiment, the hot steam condensate or low pressure steam of less than 3.5 bar after providing heat to the heat exchanger is(are) transformed into a cooled condensate and said cooled condensate is further used to recover heat from fumes of a steam generator. In this later embodiment this enables to use the evaporative pond, the ambient air, and the associated enhanced evaporation method of present invention as an enhanced cooling system for the steam generator to recover more energy from the steam generator for a given amount of combustible. In a variant of this later embodiment, the combustible is a hydrogenated and/or humid combustible and the condensates of the fumes of the steam generator are advantageously recycled to the soda ash process, in particular to trona/nahcolite/wegscheiderite ore solution mining.

In another embodiment of present invention, the heat is generated by a gas fired heater fuelled by a ventilation air methane recovered from a longwall gob vent. In a variant of this embodiment, the ventilation air methane recovered from a longwall gob vent is produced during a non-combustible ore longwall mining operation, advantageously during a trona ore longwall mining operation. This is particularly interesting as evaporative ponds are often far from sodium carbonate purification and processing plant, therefore far from available heat, but evaporative ponds are frequently close to natural ores extraction fields where ventilation air methane may be available from longwall gob vents.

The possibility to use steam condensates nearby the evaporative pond, gives the possibility of specific synergy between the method according the invention using low temperature heat with the possibility to rinse the spraying device in order to clean it and get rid off of accumulated crystals of soluble salts such as sodium carbonate or bicarbonate salts. Indeed, the depleted amount of calcium and magnesium ions in steam condensates, compared to natural surface or underground waters, enable to limit the formation of insoluble precipitates such as calcium or magnesium carbonates otherwise generated with natural surface or underground waters. Generally steam condensates comprise at most 10 ppm, advantageously at most 5 ppm of calcium and/or magnesium. In one embodiment of present invention, water, preferably steam condensate, more preferably steam condensate at a temperature of at least 35° C., is sequentially fed to the spraying device in replacement of at least part of the heated pond liquor. Advantageously in this embodiment, water, preferably the steam condensate, more preferably the steam condensate at a temperature of at least 35° C., is sequentially fed to the spraying device in replacement of at least part of the heated pond liquor at least 1 minute per period of 8 hours, more preferably at least 1 minute per period of 4 hours, most preferably at least 1 minute per period of 2 hours. Advantageously in those last two embodiments, water, preferably the steam condensate, more preferably the steam condensate at a temperature of at least 35° C., is sequentially fed to the spraying device in replacement of at least part of the heated pond liquor at most 20 minutes per period of 8 hours, more preferably at most 15 minutes per period of 4 hours, most preferably at most 10 minutes per period of 2 hours. Those ranges of minimum and/or maximum sequential duration of water or condensates feeding, have proven to increase sensitively the operating duration of the spraying device before clogging. In a variant of those embodiments the differential pressure of the liquor in the spraying device relatively to the pressure of ambient air is measured; and when the differential pressure is about 25% or about 15% or about 10% higher than the said differential operating pressure when the spraying device is clean, the water, preferably the steam condensate, more preferably the steam condensate at a temperature of at least 35° C., is sequentially fed to the spraying device at least one minute and at most 20 minutes, preferably at most 15 minutes, more preferably at most 10 minutes.

In one embodiment of the present method, the sodium carbonate pond liquor contains also sodium chloride and/or sodium sulfate. Advantageously when the sodium carbonate aqueous stream contains sodium chloride and/or sodium sulfate, the method further comprises purging part of the pond liquor into a subsequent pond so as to control the sodium chloride or the sodium sulfate concentration in the pond liquor. The pond liquor comprises generally at least 2%, or at least 4%, or at least 6%, or at least 8% by weight of sodium chloride, or of sodium sulfate, or of sodium chloride and sodium sulfate. In a first sub-embodiment of the present one embodiment, the pond liquor comprises at most 20%, advantageously at most 10% by weight of sodium chloride, or of sodium sulfate. In a second sub-embodiment of the present one embodiment, the pond liquor comprises at most 10% by weight of sodium chloride and at most 4% of sodium sulfate. This enables to limit the presence of sodium sulfate in sodium carbonate decahydrate crystals by formation of co-crystallized double salt ($Na_2CO_3.2Na_2SO_4$).

In a particular embodiment of the present invention, the evaporative pond is fed with a sodium carbonate aqueous stream for recovering partly or totally the sodium carbonate from the sodium carbonate aqueous stream.

In a first variant of the particular embodiment, the sodium carbonate aqueous stream is an aqueous solution from a solution mining process, generally a trona ore, or a nahcolite ore, or wegscheiderite ore solution mining, preferably a trona ore solution mining, and wherein the sodium carbonate aqueous stream comprises at least 1%, advantageously at least 6%, and comprises at most 30% by weight of sodium carbonate. Using the method of the present invention to such sodium carbonate aqueous stream feeding the evaporative pond enables to concentrate the aqueous solution from the solution mining process. The pond liquor obtained in the evaporative pond may then be cooled down to provide crystallization promoting conditions of sodium carbonate decahydrate. Advantageously the pond liquor is cooled down by exposing the pond liquor to an ambient temperature of less than 10° C., preferably less than 2° C., using one of the methods described in WO2009/068670 page 2 line 21 to page 4 line 31, included here by reference, and wherein the pond liquor is the provided "effluent".

In a second variant of the particular embodiment, the sodium carbonate aqueous stream comprises, or consists essentially of, or consists of: an aqueous purge from a sodium carbonate crystallizer or from a sodium carbonate derivative crystallizer, and comprises advantageously at least 6% and at most 30% by weight of sodium carbonate. In this second variant, the sodium carbonate aqueous stream may also derive from an aqueous solution from a solution mining process, such as a trona ore, or a nahcolite ore, or wegscheiderite ore solution mining, preferably a trona ore solution mining. This is the case for instance when the sodium carbonate crystallizer or the sodium carbonate derivative crystallizer, such as a sodium carbonate monohydrate crystallizer or a sodium sesquicarbonate crystallizer or a sodium bicarbonate crystallizer, are fed with an aqueous solution deriving from a solution mining process. Using the method of the present invention to such sodium carbonate aqueous stream feeding the evaporative pond enables to concentrate the aqueous solution comprising or consisting of the aqueous purge. The pond liquor obtained in the evaporative pond may then be cooled down to provide crystallization promoting conditions of sodium carbonate decahydrate.

Preferably in this second variant, the pond liquor is cooled down by exposing the pond liquor to an ambient temperature of less than 10° C., preferably less than 2° C., using one of the methods described in WO2009/068670 page 2 line 21 to page 4 line 31, included here by reference, and wherein the pond liquor is the provided "effluent".

In a third variant of the particular embodiment, the sodium carbonate aqueous stream is generated in a first pond wherein a sodium carbonate aqueous effluent, advantageously a sodium carbonate aqueous effluent comprising or consisting of a sodium carbonate aqueous purge from a sodium carbonate crystallizer or from a sodium carbonate derivative crystallizer, is fed to the first pond, the sodium carbonate aqueous effluent is cooled down so as to generate:
  sodium carbonate decahydrate crystals, and
  the sodium carbonate aqueous stream.

The sodium carbonate aqueous stream is then drained off from the first pond. The sodium carbonate aqueous stream is then fed, according the present invention, in the evaporative pond. The sodium decahydrate crystals are removed at least partly from the first pond. Advantageously this first pond provides a "crystallizing pond" or a "first pond" according one of the methods described in WO2009/068670 from page 2, line 21 to page 4, line 31, incorporated herein by reference.

In a first another embodiment of the present invention and of any embodiment, variant and sub-embodiment above described, the method of present invention advantageously further comprises the steps of:
  stopping the feeding of the part of the pond liquor to the heat exchanger and to the spraying device before reaching a saturated pond liquor in sodium salts at the ambient air temperature,
  allowing the water of the pond liquor to further evaporate by further exposing the pond liquor to ambient air conditions, typically during the summer months, in the same evaporative pond or in a further evaporative crystallization pond area so as to crystallize further sodium salts comprising sodium chloride or sodium sulfate.

Or alternatively of the first another embodiment, therefore in a second another embodiment of the present invention and of any embodiment, variant and sub-embodiment above described, the method advantageously further comprises the steps of:

stopping the feeding of the part of the pond liquor to the heat exchanger and to the spraying device before reaching a saturated pond liquor in sodium salts at the ambient air temperature,
feeding the pond liquor to a solution mining cavity or a mined out cavity or in a deep well injection.

The present invention also relates to a method for decreasing the cost of truck transportation of a reclaimed pond solid comprising sodium carbonate decahydrate comprising:
f) harvesting the reclaimed pond solid
g) feeding part of the harvested reclaimed pond solid to melter maintained at a temperature of at least about 20° C., preferably at least about 25° C., more preferably at least about 30° C., most preferred at least 35° C., so as to produce a melter liquor,
h) feeding part of the melter liquor to a heat exchanger,
i) heating the melter liquor in the heat exchanger with a waste heat so as to produce a heated melter liquor,
j) removing part of the heated melter liquor and transporting the part of the heated melter liquor providing a feedstock to a process which produces sodium carbonate, or a sodium carbonate derivative,
k) feeding the remaining part of the heated melter liquor back to the melter so as to melt part of the reclaimed pond solid, wherein the reclaimed pond solid comprising sodium carbonate decahydrate is produced in a at least 2 ponds management process, said 2 ponds management process comprising:
a) providing a sodium carbonate aqueous effluent, advantageously a sodium carbonate aqueous effluent comprising a purge from the process which produces sodium carbonate, or a sodium carbonate derivative,
b) providing a cooling crystallization pond and an evaporative crystallization pond,
c) feeding the sodium carbonate aqueous effluent into the cooling crystallization pond,
d) cooling down the sodium carbonate aqueous effluent by exposing it to an ambient air temperature of less than 10° C., preferably of less than 2° C., so as to promote sodium carbonate decahydrate cooling crystallization conditions, such as during the cool ambient temperature of the winter season, and so as to generate (1) the pond solid to be reclaimed comprising sodium carbonate decahydrate crystals and (2) a pond liquor comprising sodium carbonate and another solubilised sodium salt such as sodium chloride or sodium sulfate or a sodium carbonate derivative salt,
e) draining off the pond liquor of the cooling crystallizing pond and feeding it to the evaporative crystallization pond,
f) harvesting the reclaimed solid from the cooling crystallizing pond which is further processed according above steps g) to k),
l) exposing the pond liquor in the evaporative crystallization pond to a second ambient air conditions, such as ambient air conditions during summer months, so as to promote an evaporation of at least part of the water of the pond liquor and to crystallize sodium carbonate and another sodium salt such as sodium chloride, sodium sulfate or sodium carbonate derivative salt.

The scope of protection is not limited by the description set out above, but is only limited by the claims which follow, that scope including all equivalents of the subject matter of the claims.

Each and every claim is incorporated into the specification as an embodiment of the present invention. Thus, the claims are a further description and are an addition to the preferred embodiments of the present invention, in particular the claims of the priority U.S. provisional application No. 61/740,195 filed on Dec. 20, 2012 incorporated herein by reference, and specified at the beginning of this description.

While preferred embodiments of this invention have been shown and described, modifications thereof can be made by one skilled in the art without departing from the spirit or teaching of this invention. The embodiments described herein are exemplary only and are not limiting. Many variations and modifications of systems and methods are possible and are within the scope of the invention.

Should the disclosure of any patents, patent applications, and publications which are incorporated herein by reference conflict with the description of the present application to the extent that it may render a term unclear, the present description shall take precedence.

The invention claimed is:

1. A method for increasing the evaporation rate of an evaporative pond containing pond liquor comprising water and at least 1% by weight of sodium carbonate, said evaporative pond being in contact with an ambient air at an ambient air temperature of more than 0° C., wherein said pond liquor further contains at least 2% by weight of sodium chloride, or of sodium sulfate, or of both sodium chloride and sodium sulfate, said method comprising the following steps:
   feeding part of said pond liquor to a heat exchanger;
   heating said pond liquor in said heat exchanger with heat and producing a heated pond liquor;
   feeding said heated pond liquor into a spraying device at an operating temperature of at least 10° C. above the ambient air temperature; and
   spraying said heated pond liquor into an open area of said evaporative pond with said spraying device, so as to evaporate at least part of the water of said pond liquor when sprayed, wherein water, or steam condensate, or steam condensate at a temperature of at least 35° C., is sequentially fed to said spraying device in replacement of at least part of said heated pond liquor at least 1 minute per period of 8 hours.

2. The method according to claim 1 wherein said pond liquor comprises at most 30% by weight of sodium carbonate.

3. The method according to claim 1 wherein said pond liquor comprises at most 4% by weight of sodium bicarbonate.

4. The method according to claim 3 wherein said pond liquor comprises at most 18% sodium carbonate and at most 3% sodium bicarbonate.

5. The method according to claim 1 wherein the ambient air temperature is at least 15° C.

6. The method according to claim 1 wherein said operating temperature is at least 30° C.

7. The method according to claim 1 wherein said spraying device is selected from the group consisting of irrigation sprinkler device, rotating sprinkler device, hose reel raingun sprinklers system, centre pivot sprinklers system, spray nozzles, spray nozzles arrays, turbomist device, and combinations thereof.

8. The method according to claim 1 wherein said heat is selected from the group consisting of hot steam condensate, low pressure steam of less than 3.5 bars, and combination thereof.

9. The method according to claim 8 wherein said hot steam condensate or low pressure steam of less than 3.5 bar after providing heat to said heat exchanger is transformed into a cooled condensate, and wherein said cooled condensate is further used to recover heat from fumes of a steam generator.

10. The method according to claim 1 wherein said heat is generated by a gas fired heater fuelled by methane recovered from a longwall gob vent.

11. The method according to claim 1 wherein said water or said steam condensate, or said steam condensate at a temperature of at least 35° C., is sequentially fed to said spraying device in replacement of at least part of said heated pond liquor at least 1 minute per period of 2 hours.

12. The method according to claim 1, wherein said method further comprises purging part of said pond liquor into a subsequent pond to control the sodium chloride or the sodium sulfate concentration in said pond liquor.

13. The method according to claim 1 wherein said evaporative pond is fed with a sodium carbonate aqueous stream for recovering partly or totally the sodium carbonate from said sodium carbonate aqueous stream.

14. The method according to claim 13 wherein said sodium carbonate aqueous stream comprises an aqueous purge from a sodium carbonate crystallizer or from a sodium carbonate derivative crystallizer, and comprises at least 6% and at most 30% by weight of sodium carbonate.

15. The method according to claim 13 wherein said sodium carbonate aqueous stream is generated in a first pond, and wherein a sodium carbonate aqueous effluent comprising or consisting of a sodium carbonate aqueous purge from a sodium carbonate crystallizer or from a sodium carbonate derivative crystallizer, is fed to said first-pond, said sodium carbonate aqueous effluent is cooled down so as to generate:
   sodium carbonate decahydrate crystals, and said sodium carbonate aqueous stream.

16. The method according to claim 1 further comprising the steps of:
   stopping the feeding of said part of said pond liquor to said heat exchanger and to said spraying device before reaching a saturated pond liquor in sodium salts at the ambient air temperature,
   allowing the water of said pond liquor to further evaporate by further exposing said pond liquor to ambient air conditions, in the same evaporative pond or in a further evaporative crystallization pond area so as to crystallize further sodium salts comprising sodium chloride or sodium sulfate.

17. The method according claim 1 further comprising the steps of:
   stopping said feeding of the part of said pond liquor to said heat exchanger and to said spraying device before reaching a saturated pond liquor in sodium salts at the ambient air temperature,
   feeding said pond liquor to a solution mining cavity or a mined out cavity or in a deep well injection.

18. A process for manufacturing sodium carbonate or a sodium carbonate derivative comprising the method according to claim 1.

19. A method for increasing the evaporation rate of an evaporative pond containing pond liquor comprising water and at least 1% by weight of sodium carbonate, said evaporative pond being in contact with an ambient air at an ambient air temperature of more than 0° C. and lower than 35° C. wherein said pond liquor further contains at least 2% by weight of sodium chloride, or of sodium sulfate, or of both sodium chloride and sodium sulfate, said method comprising the following steps:
   feeding part of said pond liquor to a heat exchanger;

heating said pond liquor in said heat exchanger with heat and producing a heated pond liquor;

feeding said heated pond liquor into a spraying device at an operating temperature of at least 10° C. above the ambient air temperature; and spraying said heated pond liquor into an open area of said evaporative pond with said spraying device, so as to evaporate at least part of the water of said pond liquor when sprayed, wherein said heated pond liquor is sequentially over-heated during a period of time from 5 to 10 minutes every one or two hours at a sequential temperature before being sprayed by said spraying device, and wherein said sequential temperature is at least 5° C. above said operating temperature.

20. The method according to claim 19 wherein said pond liquor comprises at most 4% by weight of sodium bicarbonate.

21. The method according to claim 19 wherein said spraying device is selected from the group consisting of irrigation sprinkler device, rotating sprinkler device, hose reel raingun sprinklers system, centre pivot sprinklers system, spray nozzles, spray nozzles arrays, turbomist device, and combinations thereof.

* * * * *